United States Patent [19]

Takahashi et al.

[11] Patent Number: 4,939,011
[45] Date of Patent: Jul. 3, 1990

[54] OPTICAL DISK

[75] Inventors: Hidekazu Takahashi; Tadanori Michimoto; Yasuo Mitoh; Eiji Takabatake, all of Osaka, Japan

[73] Assignee: Nitto Denko Corporation, Osaka, Japan

[21] Appl. No.: 315,098

[22] Filed: Feb. 24, 1989

[30] Foreign Application Priority Data

Feb. 24, 1988 [JP] Japan ................................ 63-43033

[51] Int. Cl.$^5$ ................................ B32B 3/02
[52] U.S. Cl. .................................... 428/64; 428/65; 428/209; 428/409; 428/446; 428/447; 428/448; 428/457; 428/913; 430/945; 525/477; 369/284; 369/286; 369/288; 346/1.1; 346/76 L; 346/135.1
[58] Field of Search ................ 525/477; 428/64, 65, 428/209, 913, 409, 446-448, 457; 369/284, 286, 288; 346/1.1, 76 L, 135.1; 430/945

[56] References Cited

U.S. PATENT DOCUMENTS

| | | | |
|---|---|---|---|
| 4,255,316 | 3/1981 | Blizzard | 525/477 |
| 4,518,716 | 5/1985 | Lee et al. | 525/477 |
| 4,572,918 | 2/1986 | Lee et al. | 525/477 |
| 4,663,397 | 5/1987 | Morita et al. | 525/477 |
| 4,753,977 | 6/1988 | Merrill | 525/477 |

Primary Examiner—Patrick Ryan
Attorney, Agent, or Firm—Sughrue, Mion, Zinn, Macpeak & Seas

[57] ABSTRACT

An optical disk comprising a pair of substrates, each having a recording surface and a reflective layer in super-position on one side, is disclosed. Such an optical disk has satisfactory shear adhesive strength and peeling strength under high temperature and high moisture conditions.

8 Claims, 1 Drawing Sheet

OPTICAL DISK

FIELD OF THE INVENTION

The present invention relates to an optical disk such as a video disk or compact disk for a read-only video which reproduces imformation with laser light, or a disk memory which is capable of both information recording and playback or erasure.

BACKGROUND OF THE INVENTION

The substrates of optical disks such as video disks, compact disks and disk memories are conventionally made of hard plastics such as methyl methacrylate and polycarbonates. Such an optical disk employs two substrates each having a recording surface and a metallic reflective layer formed in superposition on one side. The two substrates are positioned in such a manner that the reflective layer on one substrate will face the reflective layer on the other substrate and are bonded together, with a spacer being interposed therebetween over the entire surface except the center hole or in two selected areas, one being around the center hole and the other on the periphery.

Adhesives which are conventionally used in bonding optical disk substrates include solvent type adhesive (e.g. epoxy based adhesives), heat activatable adhesives, and two-component condensation type cold curable silicone rubber based adhesives. Solvent type adhesives have the disadvantage that they erode both the substrates themselves and the reflective films. Besides, they are unsuitable for mass production since the substrates have to be held stationary under uniform pressure applied for a long period of time until the adhesives are completely cured. Heat activatable adhesives have the advantage that they can be solidified in a short period of time after activation. On the other hand, the heat applied for activation gives thermal strain to the substrates to induce deformation of the substrates and the disk is unable to rotate uniformly to reproduce exact information.

In order to ensure that storage of an optical disk at a high temperature for a long period of time will not cause any deterioration in quality thereof, optical disks are required to have a shear adhesive strength of at least 10 kg/cm$^2$ and a peeling strength of at least 0.7 kg/20 mm after they have been subjected to a wet heat test under the conditions of 70° C.×85% R.H. (relative humidity) for 2,000 hours. However, none of the optical disks has been yet developed to fully satisfy those requirements.

SUMMARY OF THE INVENTION

Accordingly, one object of the present invention is to provide an optical disk produced by a process which is suitable for mass production and which involves neither attack of any parts such as substrates nor thermal strain.

Another object of the present invention is to provide an optical disk having satisfactory shear adhesive strength and peeling strength after having been subjected to a wet heat test under the conditions of 70° C.×85% R.H. for 2,000 hours.

These objects of the present invention can be attained by either one of the following methods:

(1) placing a pair of disk substrates, each of which has a recording surface and a metallic reflective layer in super-position on one side, in such a manner that the reflective layer on one substrate faces the reflective layer on the other substrate, and bonding the two substrates with a smooth-surfaced silicone-made double-side pressure-sensitive adhesive member; or (2) placing a pair of disk substrates, each of which has a recording surface and a metallic reflective layer in superposition on one side, in such a manner that the reflective layer on one substrate faces the reflective layer on the other substrate, interposing spacers between the two substrates at both outer peripheral and inner peripheral portions of the substrates, and bonding the two substrates by adhering interfaces between the substrates and the spacers with a smooth-surfaced silicone-made double-side pressure-sensitive adhesive member.

In a preferred embodiment, the smooth-furfaced silicone-made double-side pressure-sensitive adhesive member comprises a mixture or condensation product of a copolymer resin consisting essentially of $SiO_2$ units and $R_3SiO_{0.5}$ units wherein R is an alkyl group having 1 to 4 carbon atoms, an alkenyl group or an aryl group, and a diorganopolysiloxane consisting essentially of $R_2SiO$ units wherein R is the same as defined above.

DETAILED DESCRIPTION OF THE INVENTION

Figure 1:
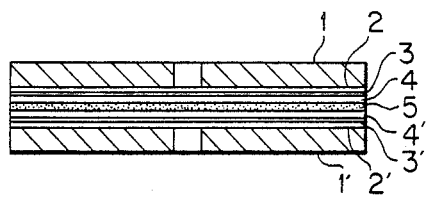
FIG. 1 is a cross section of an optical disk according to one embodiment of the present invention.

FIG. 1 shows, in a cross section, an optical disk according to one embodiment of the present invention; 1 and 1' are each a disk substrate made of a hard plastic such as methyl methacrylate or polycarbonate; 2 and 2' are each a recording surface; 3 and 3' are each a metallic reflective layer; 4 and 4' are each a reflective layer protecting layer which may be provided as required; and 5 is a smooth-surfaced silicone-made double-side pressure-sensitive adhesive member.

Figure 2:
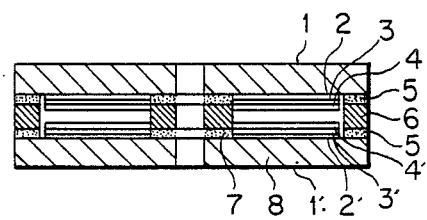
FIG. 2 is a cross section of an optical disk according to another embodiment of the present invention.

FIG. 2 shows, in a cross section, an optical disk according to another embodiment of the present invention; 6 is an outer peripheral spacer made of the same material as that of substrate 1; 7 is an inner peripheral spacer; and 8 is a hollow portion formed between the spacers 6 and 7.

Figure 3:
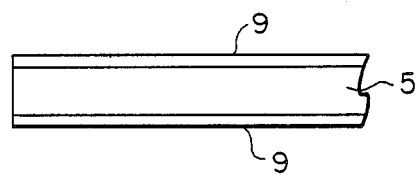
FIG. 3 is a partial side view showing the siliconebase pressure-sensitive adhesive member in bulk form used in the fabrication of the optical disk of the present invention.

FIG. 3 is a partial side view showing, in bulk form, a silicone-made pressure-sensitive adhesive member 5 comprising the above-described copolymer resin and diorganopolysiloxane. A film or sheet 9 having a very smooth (surface roughness: 1 μm or less) and low-adhesive surface is attached temporarily to both sides of the member 5. Materials of film or sheet 9 are a polyester, polypropylene, etc. The member 5 may be composed of a silicone-made pressure-sensitive adhesive alone, but if desired, a transparent plastic film such as a polyester, polyolefin, polyimide, polyether sulfone, polyether ether ketone or polyphenylene sulfite film may be used as the core material of the member 5.

The silicone-made pressure-sensitive adhesive which constitutes the member 5 is described below. In the preferred embodiment, the adhesive is comprised of a mixture or condensation product of a copolymer resin and a diorganopolysiloxane.

The copolymer resin consists essentially of two components of a $SiO_2$ unit and an $R_3SiO_{0.5}$ unit such as trimethylsiloxane, triethylsiloxane, methylvinylpropylsiloxane, divinylmethylsiloxane, phenyldimethylsiloxane or diphenylsiloxane. The molar ratio of $SiO_2$ to $R_3diO_{0.5}$ unit is preferably in the range of from 1:0.3 to 1:1.2. The organic group in the triorganosiloxane represented by $R_3SiO_{0.5}$ unit is constituted by an alkyl group having 1 to 4 carbon atoms such as methyl, ethyl or propyl, an alkenyl group such as vinyl or allyl, or an aryl group such as phenyl, naphthyl or tolyl.

Diorganopolysiloxane consists essentially of an $R_2SiO$ unit such as dimethylsiloxane, diethylsiloxane, ethylmethylsiloxane, propylmethylsiloxane, or vinylmethylsiloxane and is a siloxane terminated with a hydroxyl group at the ends of its molecular chain. To attain the objects of the present invention, this diorganopolysiloxane should have a viscosity of at least 100,000 cSt, preferably 500,000 to 3,000,000 cSt, at 25° C. The viscosity is generally measured with, for example, Brookfield viscometer.

The organic group in the siloxane represented by $R_2SiO$ unit is constituted by an alkyl group having 1 to 4 carbon atoms such as methyl, ethyl or propyl, an alkenyl group such as vinyl or allyl, or an aryl group such as phenyl or naphthyl. It is preferred that such an organic group contains at least 5 mol % of an aryl group, in particular a phenyl group.

A preferred example of the diorganopolysiloxane is a siloxane rubber which contains both methyl and phenyl groups as organic groups, with the proportions of methyl phenyl groups being in the range of from 95 to 75 and from 5 to 25 mol %, preferably from 90 to 80 and from 10 to 20 mol %, respectively, from the standpoint that a shear adhesive strength of at least 10 kg/cm$^2$ and a peeling strength of at least 1 kg/20 mm in a wet heat test under the conditions of 70° C. × 85% R.H. for 2,000 hours can be securely obtained.

The copolymer resin and diorganopolysiloxane are used with the weight ratio within the range of from 70:35 to 15:85, preferably from 60:40 to 25:75. They are mixed or condensed by a conventional method using an organic peroxide or a metal salt of, for example, carboxylic acid to prepare a silicone-made pressure-sensitive adhesive having excellent adhesive and cohesive properties under normal conditions (25±2° C.; 65±5% R.H.). A filler, a plasticizer, a colorant or any other necessary additive may be incorporated into this adhesive, in suitable amounts.

The pressure-sensitive adhesive thus prepared is applied on the surface of a base film or sheet having a very smooth (surface roughness: 1 μm or less) and low-adhesion surface to form a coating having a thickness of 10 to 300 μm and the resulting laminate is then wound on itself in roll form. Alternatively, the surface of the adhesive layer is covered with the same base film or sheet as described above to form a planar form. If a core material is interposed between the adhesive layers, the thickness of each adhesive layer is generally about 5 to 150 μm as a guide figure.

The pressure-sensitive tape or sheet in either roll or planar form can be processed into a smooth-surface pressure-sensitive adhesive member by the following method: when the tape or sheet is in roll form, it is unwound and only the adhesive layer is cut to form a plurality of equally spaced circular adhesive members, with the undesired areas being then removed (in the case of producing an optical disk of the type as shown in FIG. 1); when the tape or sheet is in planar form, only the adhesive layer is likewise cut to form concentric adhesive rings, one being of a larger diameter (for use as an outer peripheral spacer) than the other (for use as an inner peripheral spacer), and the base film or sheet under the center hole of the smaller-diameter ring is simultaneously punched out (in the case of producing an optical disk of the type as shown in FIG. 2). Generally, the same method is applied to the planar tape or sheet and the base film or sheet under the adhesive layer may be peeled either before or after the processing.

An optical disk is fabricated by the following procedures: The pressure-sensitive adhesive members spaced at equal distances on the surface of the base film or sheet are sequentially attached to the metallic reflective layer on one disk substrate, with care being taken to ensure that no air will be entrapped between the reflective layer and each adhesive member (this may be accomplished by pressing between rollers the base film or sheet having the adhesive members from one end portion), and after peeling off the base film or sheet, the other disk substrate is attached to the adhesive side of the first substrate.

The thus fabricated optical disk of the present invention has the following advantages. Firstly, the pressure-sensitive adhesive member will not attack the substrates or any other parts of the disk. Secondly, the disk is free from any thermal strain since it does not require heating in the process of its fabrication. Thirdly, the disk is adapted for mass production. Fourthly, this optical disk retains high shear adhesive strength and peeling strength and will not generate any dropout noise even if it is subjected to a wet heat test under rigorous conditions.

The present invention is now illustrated in greater detail by reference to Examples, but it should be understood that the present invention is not deemed to be limited thereto. In these examples, all the parts are by weight unless otherwise indicated.

EXAMPLE 1

Two bulk substrates for optical disk were prepared from a polycarbonate resin by injection molding. A recording surface was formed one side of each bulk substrate. As a metallic reflective layer, an aluminum layer was formed in a thickness of about 1000 Å over the recording surface by vacuum deposition to an optical disk substrate.

A silicone pressure-sensitive adhesive consisting essentially of 50 parts of a copolymer resin comprising $SiO_2$ and $R_3SiO_{0.5}$ units in a molar ratio of 1:0.55 and 50 parts of diorganopolysiloxane (8000,000 cSt at 25° C.) comprising $R_2SiO$ units containing 15 mol% phenyl group and 85 mol % methyl group was prepared. This adhesive was formed in a thickness of 30 μm on both sides of a 25 μm thick polyester film by conventional method. A polyester film which had been subjected to a release treatment to make the surface thereof smooth and low adhesive was bonded to both sides of the assembly to obtain an adhesive member in planar form.

The adhesive member was punched to the same shapes as that of the disk substrates. After stripping the polyester film on one side thereof, the adhesive membrane was attached to the reflective layer on one substrate. Thereafter, the polyester film was stripped from the other side of the adhesive member and the adhesive membrane was attached to the reflective layer of the other substrate. The two substrates bonded through the adhesive membrane were pressed uniformly to obtain an optical disk.

The optical disk thus fabricated was entirely free from deformation and could be left to stand for 6 months without any corrosion occurring in the reflective layers.

This optical disk was subjected to a wet heat test under the conditions of 70° C. and 85% R.H. for 2,000 hours. The disk retained a shear adhesive strength of 15 kg/cm$^2$ and a peeling strength of 1.1 kg/20 mm, and did not generate any dropout noise.

EXAMPLE 2

An optical disk was obtained in the same manner as in Example 1 except that a diorganopolysiloxane wherein organic groups were all methyl groups was used.

This optical disk was entirely free from deformation and corrosion. After a wet heat test, the disk retained a shear adhesive strength of 13 kg/cm$^2$ and a peeling strength of 0.8 kg/20 mm.

From the results of Examples 1 and 2, it will be apparent that an optical disk having higher reliability can be obtained when a diorganopolysiloxane which contains phenyl as an organic group is used.

Shear adhesive strength and peeling strength were measured by the following methods.

Shear adhesive strength:

A 25 mm×25 mm×25 mm piece of an adhesive member was bonded to one end of a polycarbonate (PC) plate having a size of 1 mm thickness, 25 mm width and 125 mm length. One end of another PC plate having the same size was bonded to the other side of the adhesive member piece in such a manner that the two PC plates do not overlap. A 5 kg load was applied to the bonding portion of the PC plates for 15 min. The test piece was exposed to a 70° C.×85% R.H. atmosphere for 2,000 hours and thereafter left to stand at room temperature for more than 2 hours. The extremities of the PC plates were pulled in opposite directions at a speed of 200 mm/min.

Peeling strength:

A 20 mm wide piece of adhesive member having a polyester film coated on one side thereof was bonded to a PC plate having 1 mm thickness, 40 mm width and 125 mm length in such a manner that the uncoated other side of the piece faces down. Those were pressed by one reciprocal movement of a 2 kg rubber roll over the polyester film. The test piece was left to stand at room temperature for 30 minutes, exposed to a 70° C.×85% R.H. atmosphere for 2,000 hours, and then left to stand at room temperature for more than 2 hours. The cooled test piece was subjected to a 180° peeling test at a tensile speed of 300 mm/min.

While the invention has been described in detail and with reference to specific embodiments thereof, it will be apparent to one skilled in the art that various changes and modifications can be made therein without departing from the spirit and scope thereof.

What is claimed is:

1. An optical disk comprising:
    a pair of substrates, each having a recording surface and a metallic reflective layer in superposition on one side, said pair of substrates positioned in such a manner that the reflective layer on one substrate faces the reflective layer on the other substrate, and
    a smooth-surfaced silicone-made double-side pressure-sensitive adhesive member bonding said pair of substrates together.

2. An optical disk as claimed in claim 1, wherein said a smooth-surfaced silicone-made double-side pressure-sensitive adhesive member consists essentially of:
    a mixture or condensation product of
        a copolymer resin consisting essentially of $SiO_2$ units and $R_3SiO_{0.5}$ units; and
        a diorganopolysiloxane consisting essentially of $R_2SiO$,
            wherein R is an alkyl group having 1 to 4 carbon atoms, an alkenyl group, or an aryl group.

3. An optical disk as claimed in claim 2, wherein R in said diorganopolysiloxane represented by said $R_2SiO$ unit contains at least 5 mol % of an aryl group.

4. An optical disk as claimed in claim 2, wherein said diorganopolysiloxane represented by said $R_2SiO$ unit has a viscosity of at least 500,000 cSt at 25° C.

5. An optical disk comprising:
    a pair of substrates, each having a recording surface and a metallic reflective layer in superposition on one side, said pair of substrates positioned in such a manner that the reflective layer on one substrate faces the reflective layer on the other substrate,
    a spacer interposed between said pair of substrates at both outer peripheral and inner peripheral portions of said pair of substrates, and
    a smooth-surfaced silicone-made double-side pressure-sensitive adhesive member bonding said pair of substrates together.

6. An optical disk as claimed in claimed 5, wherein said a smooth-surfaced silicone-made double-side pressure-sensitive adhesive member consists essentially of:
    a mixture or condensation product of
        a copolymer resin consisting essentially of $SiO_2$ units and $R_3SiO_{0.5}$ units; and
        a diorganopolysiloxane consisting essentially of $R_2SiO$,
            wherein R is an alkyl group having 1 to 4 carbon atoms, an alkenyl group, or an aryl group.

7. An optical disk as claimed in claim 6, wherein R in said diorganopolysiloxane represented by said $R_2SiO$ unit contains at least 5 mol % of an aryl group.

8. An optical disk as claimed in claim 6, wherein said diorganopolysiloxane represented by said $R_2SiO$ unit has a viscosity of at least 500,000 cSt at 25° C.

* * * * *